T. ROBJOHN.
Band-Ruffle.
No. 6,686. Reissued Oct. 5, 1875.
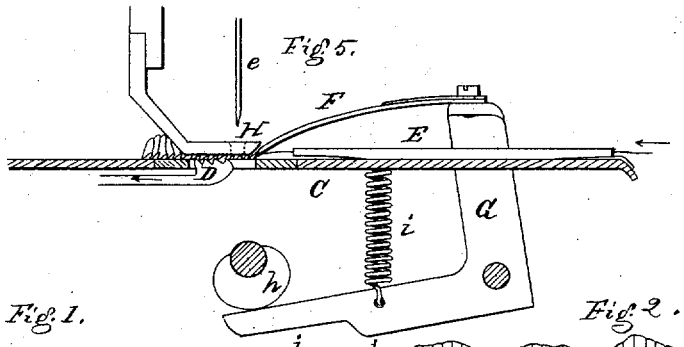
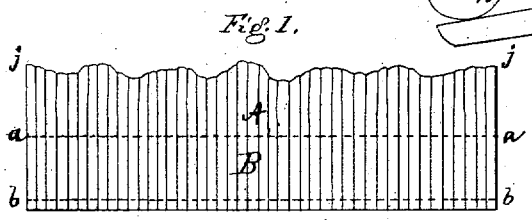
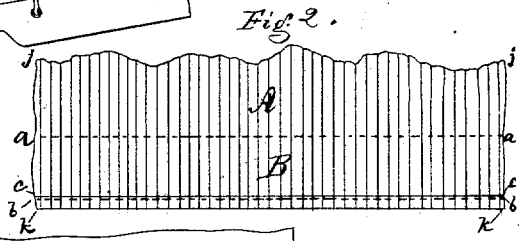
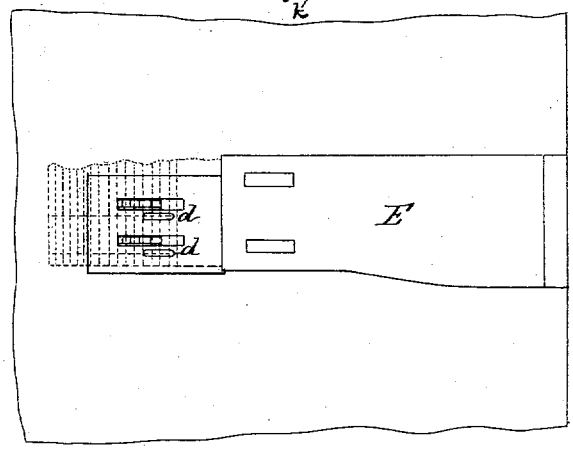
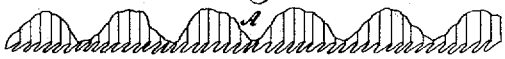
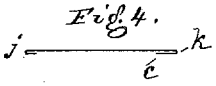
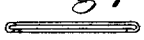
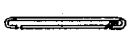
Witnesses.
L. H. Latimer.
W. J. Pratt.
Inventor.
George H. Moulton Assignee of Thomas Robjohn
per Crosby & Gregory Att'ys
N. PETERS, PHOTO-LITHOGRAPHER, WASHINGTON, D. C.

UNITED STATES PATENT OFFICE

GEORGE H. WOOSTER, OF NEW YORK, N. Y., ASSIGNEE, BY MESNE ASSIGNMENTS, OF THOMAS ROBJOHN.

IMPROVEMENT IN BAND-RUFFLES.

Specification forming part of Letters Patent No. 39,779, dated September 1, 1863; reissue No. 6,686, dated October 5, 1875; application filed August 30, 1875.

DIVISION A.

*To all whom it may concern:*

Be it known that THOMAS ROBJOHN, of the city, county, and State of New York, invented a new and Improved Band-Ruffle, whereof the following is a full, clear, and exact description, reference being had to the accompanying drawings forming part of this specification, in which—

Figure 1 is a face view of a piece of the ruffle. Fig. 2 is a back view of the same. Fig. 3 is a view of the same looking toward the edge of the band. Fig. 4 is a transverse section of the strip of muslin or other material of which the band-ruffle is composed, illustrating one stage of the manufacture. Fig. 5 is a side view of certain attachments to a sewing-machine for making the band-ruffle. Fig. 6 is a plan of certain of the parts as represented in Fig. 5. Figs. 7 and 8 are transverse sections of the guide and folder which prepare the strip of muslin or other material for the ruffling or plaiting operation.

Similar letters of reference indicate corresponding parts in the several figures.

This invention consists in the manufacture of a band-ruffle of a single strip of plaited muslin or other material, which is made to produce the ruffle or frill and the band by stitching through the plaits or gathers with two rows of stitches, one of which is also made to secure an edge of the material which is turned in to give a finish to the edge of the band.

A, Figs. 1, 2, and 3, is the ruffle or frill, and B the band. *a* is one row of stitching, which separates or forms the line of demarkation between the band and the ruffle or frill, and *b* is the other row of stitching, which secures together the portions of the plaits which form the band near the edge thereof, and at the same time secures the turned-in edge *c*, Fig. 2, of the cloth at the edge of the band. Each plait of the ruffle is narrow and regular, and extends entirely across both ruffle and band, and each plait is secured by a single and separate stitch. The result of this construction is the production of a regular wavy edge to the ruffle portion.

The most economical mode of manufacturing this band-ruffle is by means of a sewing-machine furnished with two needles and the necessary appurtenances for producing simultaneously two rows of stitching, and attached to it a folder for turning in the edge *c* of the band, and a plaiting-knife for plaiting the strip after the edge *c* has been turned in, the said folder and plaiting-knife operating on the strip. It is drawn toward the needle by means of the feeder of the sewing-machine.

The following description of the mechanism shown in the drawing will enable others to manufacture this ruffle.

C, Figs. 5 and 6, is the bed-plate of the machine, and *d d*, Fig. 6, are the holes provided in the said plate for the two needles to work through. One of the needles is shown in Fig. 5, indicated by the letter *e;* but it is not considered necessary to represent or describe particularly the mode of operating them, or the means operating in combination with them to produce the stitching, and on this point it is merely stated that the needles operate parallel with each other and simultaneously, and in combination with them on the under side of the bed-plate are employed loopers for producing chain-stitches. D is the feed, constructed and operating in any well-known manner. E is the folder for turning in the edge *c* of the strip, serving also as a gage, and guiding the strip to the plaiting-knife and needles. This folder and gage consists of a tube, the mouth of which is flat in its transverse section, as is shown in Fig. 7, and just wide enough for the passage of a strip of muslin or other material of which the band-ruffle is to be made, but which has one side folded or turned under gradually, commencing at some distance from the mouth, till at the opposite end or outlet it has the transverse sectional form shown in Fig. 8. The other side of the said tube is straight. The strip, in passing through the said tube, has its edge *c* turned under, as shown in Fig. 4. F is the plaiting-knife, attached to a lever, G, which works on a fixed fulcrum, *g*, and derives motion from a cam, *h*, and spring *i*. The knife has a straight edge, which is always transverse to the direction of the feed movement, and this edge is pressed down upon the bed C, or upon the material placed thereon, between the outlet of the guide and folder E and the presser H, either by means of springs or by its being itself made elastic. The movement of the knife is directly toward and from the needle, parallel with the feed movement, and the said movement in the direction of the feed movement commences before but terminates with the feed movement, being sufficiently longer than the latter movement to enable it to gather up the strip as it issues from the guide and folder, and push it in the form of a plait under the presser H, which is beveled, as shown in Fig. 5, to permit the plait to enter easily under it. As soon as the plaits arrive under the presser, the needles descend through them, and they are secured by being stitched in the two lines *a* and *b*, the line of stitching *b* also securing the turned-in edge *c*, and thus the portion between the turn or edge *k* of the fold before described and the line *a* of stitching is formed into a band, while the portion between the line of stitching *a* and the edge *j* is left loose to form the ruffle or frill.

The edge *j* is hemmed in another machine before the strip is introduced to the machine by which it is converted into the ruffle.

This invention is not confined to the use of any particular means of manufacturing the band-ruffle; but

What is claimed as the invention, and desired to be secured by Letters Patent, is—

1. As a new article of manufacture, the band-ruffle described and shown, consisting of a strip of plaited muslin or other material, in which the plaits are narrow and regular, and extend across the strip, the strip being made to produce both the ruffle and the band by being stitched through the plaits with two rows of stitching, one of which is also made to secure the edge of the material, which is turned in to give a finish to the band, each plait being secured by a single and separate stitch, and the ruffle-edge being caused to have a corrugated or wavy appearance, substantially as described.

2. A single ruffle having a band formed out of the same strip with the ruffle-edge, said band being hemmed and rendered stiff by being formed of narrow and regular plaits, flattened, and secured by two straight and continuous rows of stitching.

3. A single ruffle having its band and ruffle-edge in one piece, consisting of a strip of muslin or other material, hemmed at the band and plaited entirely across in regular plaits, secured by stitches formed of a series of loops passed through the fabric and secured.

In testimony whereof I have signed my name to this specification in the presence of two subscribing witnesses.

GEO. H. WOOSTER.

Witnesses:
J. V. ROCKWELL,
PHILIP BLOHM.